(12) United States Patent
Forutanpour

(10) Patent No.: US 8,391,596 B2
(45) Date of Patent: Mar. 5, 2013

(54) EFFECTIVE RED EYE REMOVAL IN DIGITAL IMAGES WITHOUT FACE DETECTION

(75) Inventor: Babak Forutanpour, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1211 days.

(21) Appl. No.: 11/874,019

(22) Filed: Oct. 17, 2007

(65) Prior Publication Data

US 2009/0103784 A1   Apr. 23, 2009

(51) Int. Cl.
 *G06K 9/00* (2006.01)
(52) U.S. Cl. .................................. 382/167; 382/117
(58) Field of Classification Search .................. 382/117, 382/167
 See application file for complete search history.

(56) References Cited

U.S. PATENT DOCUMENTS

| | | | | |
|---|---|---|---|---|
| 5,432,863 | A * | 7/1995 | Benati et al. | 382/167 |
| 5,748,764 | A * | 5/1998 | Benati et al. | 382/117 |
| 6,016,354 | A * | 1/2000 | Lin et al. | 382/117 |
| 6,873,743 | B2 * | 3/2005 | Steinberg | 382/275 |
| 7,042,505 | B1 * | 5/2006 | DeLuca | 348/241 |
| 7,088,855 | B1 * | 8/2006 | Vide | 382/167 |
| 7,155,058 | B2 * | 12/2006 | Gaubatz et al. | 382/167 |
| 7,181,091 | B2 * | 2/2007 | Yoda | 382/309 |
| 7,324,689 | B1 * | 1/2008 | Vide | 382/167 |
| 7,444,017 | B2 * | 10/2008 | Gallagher | 382/167 |
| 2002/0136450 | A1 * | 9/2002 | Chen et al. | 382/165 |
| 2003/0007687 | A1 * | 1/2003 | Nesterov et al. | 382/167 |
| 2005/0220346 | A1 * | 10/2005 | Akahori | 382/190 |
| 2005/0232490 | A1 * | 10/2005 | Itagaki et al. | 382/190 |
| 2006/0072815 | A1 * | 4/2006 | Wu et al. | 382/167 |
| 2006/0098867 | A1 * | 5/2006 | Gallagher | 382/167 |

(Continued)

FOREIGN PATENT DOCUMENTS

| | | |
|---|---|---|
| EP | 0899680 | 3/1999 |
| EP | 0899686 | 3/1999 |

(Continued)

OTHER PUBLICATIONS

European Search Report—EP08006433—Search Authority, The Hague—Oct. 21, 2008.

(Continued)

*Primary Examiner* — Matthew Bella
*Assistant Examiner* — Gandhi Thirugnanam
(74) *Attorney, Agent, or Firm* — Matthew J. Evans; James R. Gambale, Jr.

(57) ABSTRACT

Methods and apparatuses for detecting and correcting red-eye in an image are provided. In one aspect, red-eye can be detected without detecting faces. Red-eye candidates are identified and eliminated by evaluating a series of statistics, including color, size, shape, distance, etc. A plurality of regions, including an eye region, a pupil region, an iris region, and a sclera region can be associated with each red-eye candidate. Color distribution statistics are computed with respect to the presence of target color, glint, skin, or other-color pixels in the plurality of regions. Red-eye candidates may be paired with other red-eye candidates for further processing. Further statistics may be computed based on the location of the red-eye candidates in the image, and the location of each red-eye candidate relative to other red-eye candidates. Pixels associated with selected red-eye candidates may be color adjusted.

52 Claims, 16 Drawing Sheets

U.S. PATENT DOCUMENTS

| | | | |
|---|---|---|---|
| 2006/0257132 A1* | 11/2006 | Shiffer et al. | 396/158 |
| 2006/0269128 A1* | 11/2006 | Vladislav | 382/167 |
| 2007/0036438 A1* | 2/2007 | Thakur | 382/190 |
| 2007/0104472 A1* | 5/2007 | Quan et al. | 396/79 |
| 2007/0133884 A1* | 6/2007 | Hammoud | 382/225 |
| 2009/0103784 A1* | 4/2009 | Forutanpour | 382/117 |

FOREIGN PATENT DOCUMENTS

| | | |
|---|---|---|
| EP | 1684210 A1 | 7/2006 |
| EP | 2051210 A1 * | 4/2009 |

OTHER PUBLICATIONS

European Written Opinion—EP08006433—Search Authority, The Hague—Oct. 21, 2008.

International Search Report and Written Opinion—PCT/US2008/080342—ISA/EPO—Mar. 17, 2009.

* cited by examiner

ER (Includes PR, IR, and SR)

EFFECTIVE RED EYE REMOVAL IN DIGITAL IMAGES WITHOUT FACE DETECTION

FIELD

The disclosure relates to eye color correction in digital images. In particular, the disclosure relates to techniques for detecting and removing red-eye based on color distribution statistics of red-eye candidates, and other parameters such as size, location relative to an image's borders, and location relative to other red eye candidates.

BACKGROUND

The problem of red-eye is well-known in photography. Red-eye is caused by light from a camera's flash being reflected off blood vessels in a subject's retina back to the camera. Occurrence of red-eye may increase when the subject's pupils are wide open, as in a darkened room.

Various red-eye reduction algorithms have been developed to identify instances of red-eye in an image and correct them. Some algorithms perform face detection, then locate the eyes within a detected face, and finally correct for the redness of the eye. Face detection algorithms, however, are generally computation-intensive and put great demands on a computing system's power source. This makes face detection algorithms undesirable for use in some portable devices such as camera phones, which have limited computational capabilities compared to desktop computers, and must make judicious use of battery power.

Disclosed herein are computationally efficient red-eye correction techniques well-suited for devices such as camera phones.

SUMMARY

An aspect of the present disclosure provides a method for adjusting eye color in a digital image, the method comprising defining a plurality of color correction candidates, each color correction candidate comprising a plurality of pixels; classifying each pixel in each color correction candidate as either a target color pixel, or a glint pixel, or a skin pixel, or an other-color pixel; computing color distribution statistics for each color correction candidate based on the classified pixels; identifying preferred color correction candidates based on the computed statistics; and adjusting the color of the preferred color correction candidates.

Another aspect of the present disclosure provides a method for adjusting eye color in a digital image, the method comprising defining a plurality of color correction candidates, each candidate comprising a plurality of pixels; defining regions comprising a pupil region (PR), an eye region (ER), an iris region (IR), and a sclera region (SR) for each color correction candidate; computing likelihood statistics based on the regions for each color correction candidate; comparing a color correction candidate with another color correction candidate based on the computed likelihood statistics; identifying a preferred color correction candidate based on the comparing; and adjusting the color of pixels in the preferred color correction candidate.

Yet another aspect of the present disclosure provides a method for adjusting eye color in a digital image, the method comprising defining a plurality of color correction candidates, each candidate comprising a plurality of pixels; defining a pupil region (PR) for each color correction candidate; performing at least one test on each of the plurality of color correction candidates; comparing a color correction candidate with another color correction candidate based on the result of said at least one test; identifying a preferred color correction candidate based on the comparing; and adjusting the color of pixels in the preferred color correction candidate.

Yet another aspect of the present disclosure provides a method for adjusting eye color in a digital image, the method comprising defining a plurality of color correction candidates, each color correction candidate comprising a plurality of pixels; for each color correction candidate, computing a match metric between the color correction candidate and every other color correction candidate; based on the match metric, assigning a complementary color correction candidate to each color correction candidate, each color correction candidate and assigned complementary color correction candidate forming a pair; comparing a characteristic of a first pair with a second pair to determine a preferred pair; and adjusting the color of pixels in the color correction candidate and the complementary color correction candidate of the preferred pair.

Yet another aspect of the present disclosure provides a method for adjusting eye color in a digital image, the method comprising defining a plurality of color correction candidates, each candidate comprising a plurality of pixels; for each color correction candidate, selecting a complementary color correction candidate, the color correction candidate and the complementary color correction candidate forming a pair; assigning a failure metric to each pair; defining a first region in the digital image having a first spatial relationship relative to a first pair; and comparing the failure metric of any pair lying in the first region to the failure metric of the first pair.

Yet another aspect of the present disclosure provides a method for adjusting eye color in a digital image, the method comprising defining a plurality of color correction candidates, each candidate comprising a plurality of target color pixels; performing a plurality of tests on each color correction candidate; for each color correction candidate, accumulating a number of failed match points (FMP's) based on a result of each test performed; and comparing the accumulated FMP's of at least one color correction candidate to the accumulated FMP's of at least one other color correction candidate.

Yet another aspect of the present disclosure provides a method for adjusting eye color in a digital image, the method comprising defining a plurality of color correction candidates, each candidate comprising a plurality of pixels; computing an average size of the color correction candidates; identifying a color correction candidate having a size outside a range that is a function of the average size; and not adjusting the color of pixels in said identified color correction candidate.

Yet another aspect of the present disclosure provides a method for adjusting eye color in a digital image, the method comprising identifying target color pixels in the digital image; defining color correction candidates based on the target color pixels; defining a region map for each color correction candidate, the region map comprising at least one of an eye region, a pupil region, an iris region, and a sclera region; computing statistics for each color correction candidate based on its region map; identifying preferred color correction candidates based on the computed statistics; and adjusting the color of pixels in the preferred color correction candidates.

DETAILED DESCRIPTION

Disclosed herein are techniques for correcting red-eye in an image, without necessarily resorting to face detection algorithms. Note that aspects of the present disclosure may nevertheless be used in conjunction with face detection algorithms, or any other red-eye correction algorithms, to enhance their performance.

Figure 1:
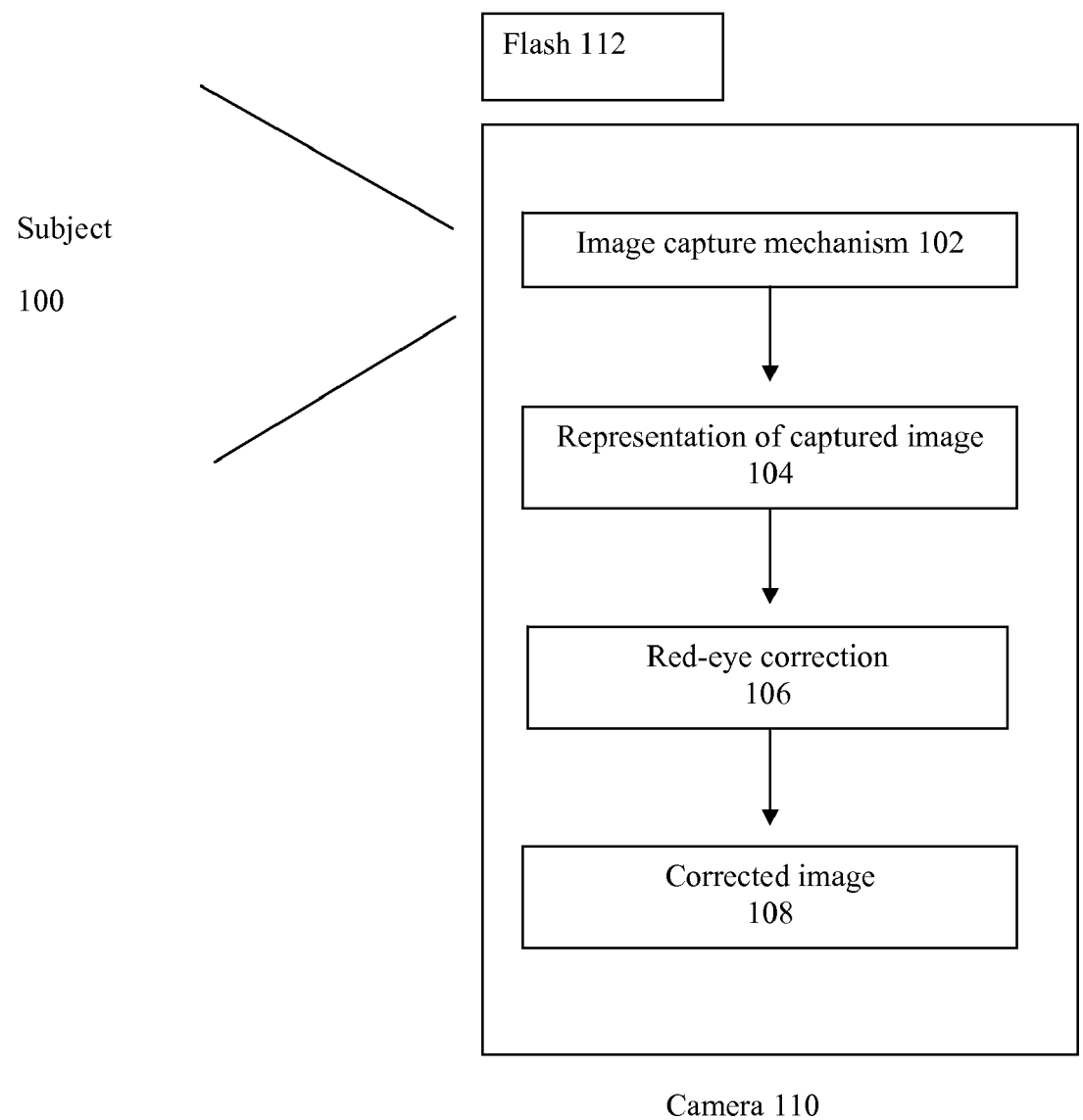
FIG. 1 shows an embodiment of an imaging system using red-eye correction techniques described herein.

FIG. 1 shows an embodiment of an imaging system using red-eye correction techniques described herein. FIG. 1 shows a camera 110, which may be embodied in a digital camera, a camera phone, or any other image capture device. Camera 110 may be provided with a flash 112 for illuminating a subject 100. Camera 110 may include an image capture component 102 which generates a captured image 104 of the subject 100. In an embodiment, the image capture component 102 may include a lens and a CMOS, CCD, or some other form of digital pixel array. The captured image 104 may be a digital image defined by a plurality of pixels. The captured image 104 can be processed by a red-eye correction block 106 as described in the present disclosure, generating the corrected image 108.

Note the embodiment shown in FIG. 1 should not be interpreted to limit the scope of the present disclosure, as the disclosed techniques may generally be applied to correct for red-eye in any digital image. For example, the disclosed techniques need not be implemented in a camera 110 as depicted in FIG. 1. Rather, some or all of the techniques disclosed may be implemented offline, for example, as part of a post-processing software program running on a personal computer (PC).

Figure 2:
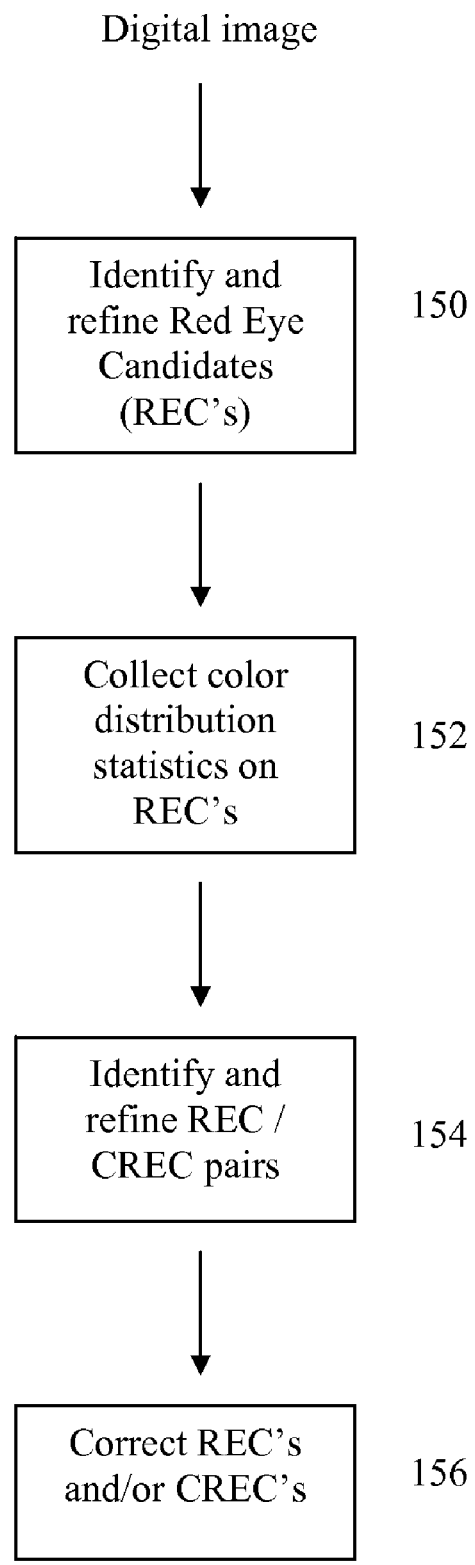
FIG. 2 shows an embodiment of the red-eye correction techniques that can be used in block 106 of FIG. 1.

FIG. 2 shows an embodiment of the red-eye correction techniques that can be used in block 106 of FIG. 1. Block 150 accepts a digital image, and identifies regions of the image that are possible red-eye candidates (REC's). In identifying a candidate list, block 150 may add or remove candidates from the list based on certain characteristics such a candidate's location, size, shape, etc., as will be described further herein. Block 152 focuses on color distribution characteristics of the identified REC's to provide more information on the likelihood of each REC being a legitimate instance of red-eye. Block 154 attempts to identify a Complementary REC (CREC) for each REC, based on the assumption that red-eye in an image is likely to occur in pairs. Finally, block 156 corrects the color in the REC's and/or CREC's identified in the previous steps.

Note other embodiments may differ from that shown in FIG. 2 while employing the techniques of the present disclosure. For example, an embodiment may sequence the blocks differently than shown in FIG. 2. Alternatively, an embodiment may add additional processing blocks to, or remove processing blocks from, the ones shown in FIG. 2. Furthermore, alternative blocks may combine aspects of separate blocks in a single block, e.g., color distribution statistic collection and REC refinement in a single block.

Figure 3:
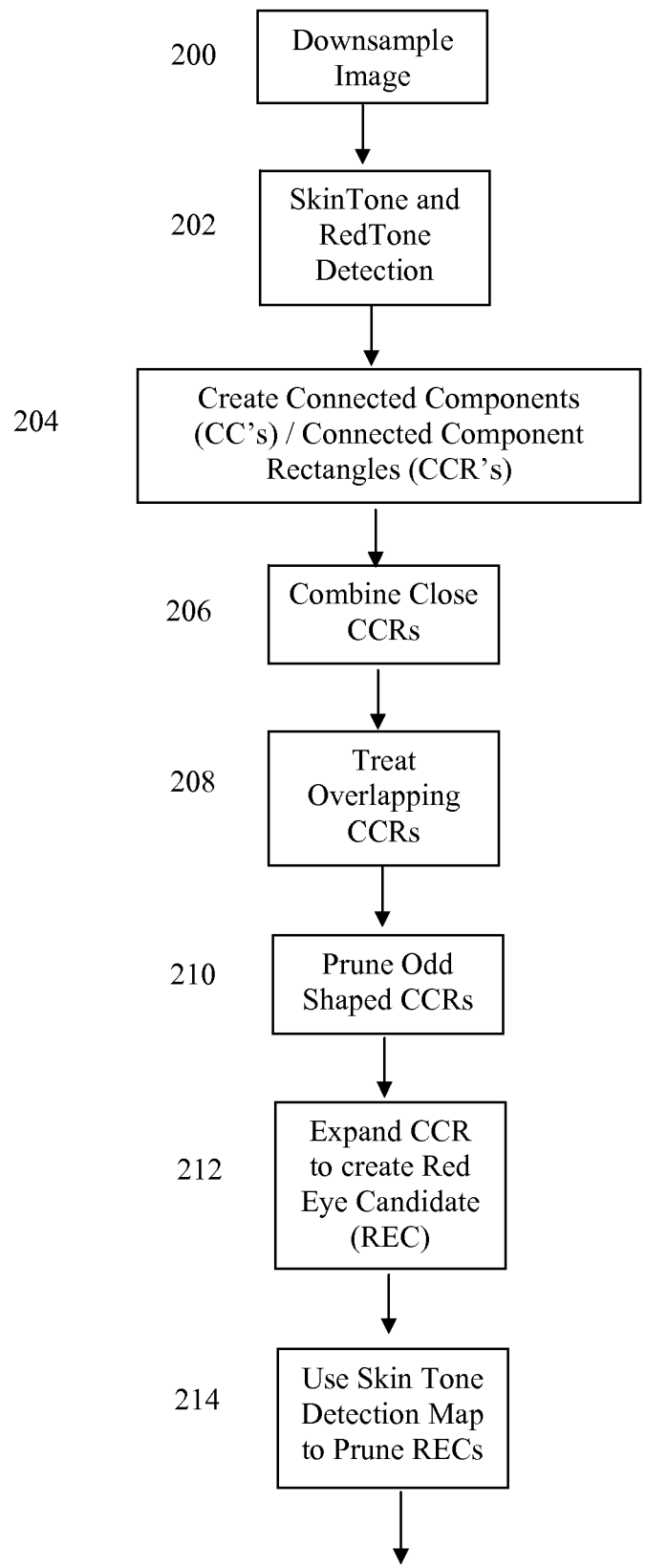
FIGS. 3-3A show an embodiment of the system depicted in FIG. 2.

FIG. 3 shows one embodiment of the system depicted in FIG. 2. The techniques depicted by blocks 202-228 may collectively function to identify the presence of red-eye in the captured image 104 of FIG. 1, and remove the identified red-eye to produce corrected image 108. The details of each block will be described herein. Note that the techniques as disclosed need not be limited to embodiments comprising all of the blocks shown in FIG. 3. Embodiments adopting various subsets of the blocks shown are contemplated as well. Also contemplated are embodiments wherein the order of the blocks is different from that depicted in FIG. 3. Unless otherwise noted, the processing techniques disclosed may generally be sequenced differently than depicted in any disclosed exemplary embodiments.

In FIG. 3, block 200 downsamples an input digital image to reduce the complexity of the subsequent computations. Downsampling is particularly suitable for embodiments of the disclosure in portable devices such as camera phones, where power can be a limited resource. In an embodiment, the image can be downsampled to ¼ of its original size by uniformly sampling every one out of four pixels of the original image. Note in other embodiments, block 200 need not be implemented, and the steps can proceed by treating the entire image rather than a downsampled version of the image.

Blocks 202-214 in FIG. 3 depict one embodiment of the block 150 in FIG. 2 for identifying and refining Red Eye Candidates (REC's) in an image.

Block 202 depicts a skin tone and red tone detection block. Skin tone detection identifies areas of the captured image 104 that have a color associated with human skin tones. The detection of image portions likely to be human skin has been treated in the prior art. Representative techniques are disclosed in U.S. Pat. App. Pub. No. 2007-0104472, entitled "Skin Color Prioritized Automatic Focus Control Via Sensor-Dependent Skin Color Correction," assigned to the assignee of the present invention and incorporated herein by reference. In an embodiment, any technique for skin tone detection, including those taught in the prior art, may be used to perform the functions of block 202. In an embodiment, skin tone pixels (or "skin pixels") may specifically be identified as any pixels in an image having values in the hue saturation value (HSV) color space noted in Table 1. Note all values given in Table 1 are on an 8-bit scale, i.e., 0 to 255.

TABLE 1

|  | Skin Hue | Skin Saturation | Skin Value |
|---|---|---|---|
| Minimum 1 | 7 | 40 | 150 |
| Maximum 1 | 19 | 175 | 245 |
| Minimum 2 | 7 | 60 | 120 |
| Maximum 2 | 19 | 160 | 150 |

Table 1 effectively specifies three HSV color ranges for skin pixels. For example, a pixel having HSV value (10, 100, 130) may be deemed to be a skin pixel because it falls within the HSV range defined by Minimum 2 and Maximum 2 in Table 1.

Note other embodiments may employ different ranges for skin tone than depicted in Table 1, or use color representations other than HSV, such as red-green-blue (RGB) or luma-chroma (YCbCr).

In contrast with skin tone detection, the red tone detection referenced in block 202 identifies pixels having reddish color commonly found in instances of red-eye. In an embodiment, the red tone may be identified as any pixel having HSV ranges as noted in Table 2. Again, all values given in Table 2 are on an 8-bit scale, i.e., 0 to 255.

TABLE 2

|  | Red Hue | Red Saturation | Red Value |
| --- | --- | --- | --- |
| Minimum 1 | 230 | 130 | 93 |
| Maximum 1 | 255 | 227 | 255 |
| Minimum 2 | 0 | 130 | 93 |
| Maximum 2 | 9 | 227 | 255 |
| Minimum 3 | 220 | 110 | 115 |
| Maximum 3 | 255 | 150 | 130 |
| Minimum 4 | 0 | 110 | 115 |
| Maximum 4 | 5 | 150 | 130 |

Note other embodiments may employ different ranges for red tone than depicted in Table 2, or use different representations of color other than HSV, such as red-green-blue (RGB) or luma-chroma (YCbCr). Note also that aspects of the present disclosure can be applied to correct not only for red-eye but for other color aberrations found in photographic images, such as blue-eye, yellow-eye, or green-eye. This can easily be done by replacing the ranges specified in Table 2 with alternative values.

Figure 4:
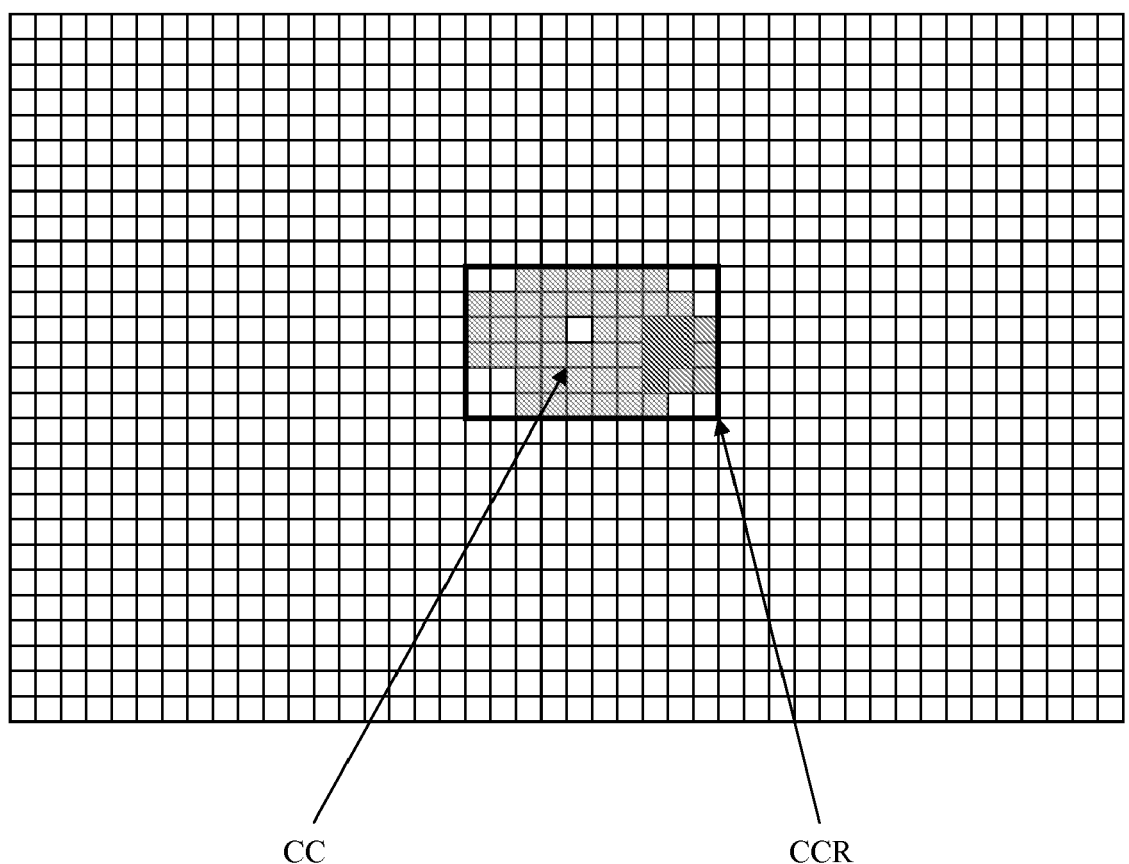
FIG. 4 depicts an example of a connected cluster (CC).

Block 204 depicts a block for creating connected clusters (CC's) and connected cluster rectangles (CCR's). This block identifies connected clusters (CC's) made up of touching red pixels (or other target color pixels) identified from block 202. The block then identifies, labels, and computes a connected cluster rectangle (CCR) for each CC identified. FIG. 4 depicts an example of a connected cluster (CC). Each of the squares in FIG. 4 represents a pixel, and each shaded square represents a red pixel. The cluster of pixels labeled "CC" has been identified as comprising a cluster of touching red pixels.

For each identified CC, a corresponding connected cluster rectangle (CCR) can be defined as the minimum-sized rectangle which entirely encloses the identified cluster. The connected cluster rectangle corresponding to the labeled CC is labeled "CCR" in FIG. 4. Note alternative embodiments may define shapes other than a rectangle to represent the identified CC's for simplified processing, such as a circle or trapezoid or other parallelograms.

In an embodiment, clusters of touching pixels can be identified using a recursive "flood fill" algorithm well-known in the prior art to determine all nodes connected to an arbitrary node in a pixel array. Other embodiments may employ other techniques to identify clusters of touching pixels.

Figure 4A:
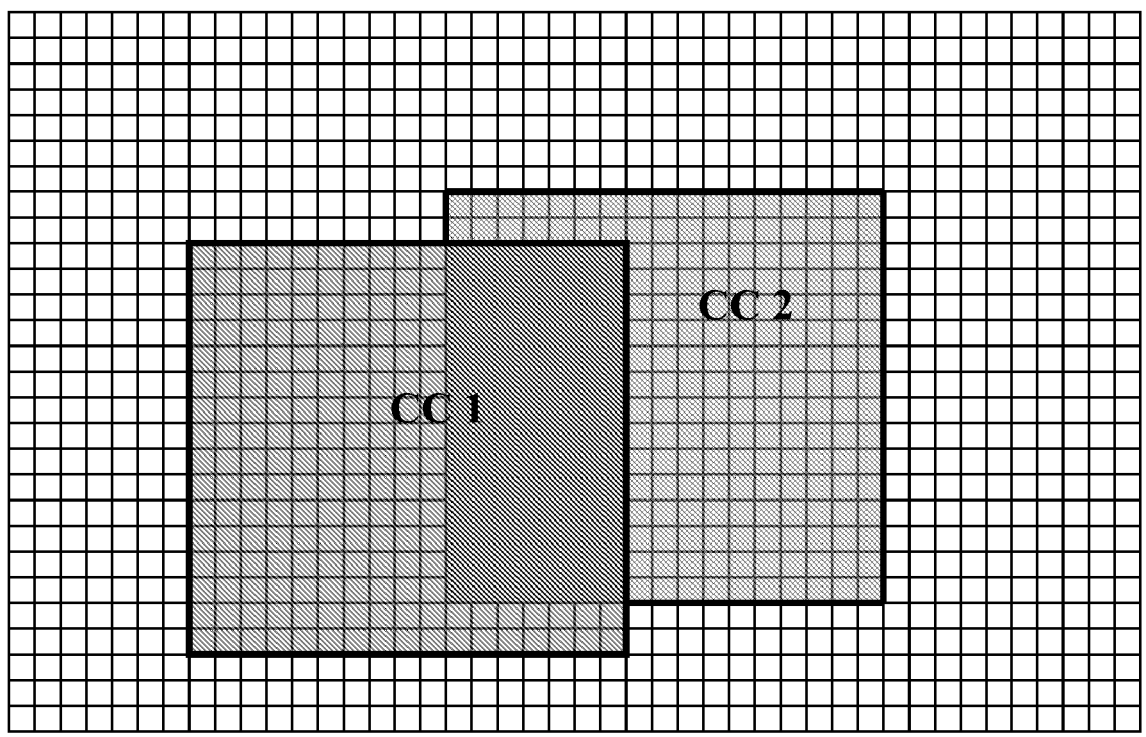
FIG. 4A depicts an example of a cluster containing a large number of touching pixels.

In an embodiment, to prevent overrunning of the memory stack in implementing the flood fill algorithm, or any other recursive algorithm, a check can be performed on the number of recursions performed. If the number of recursive calls exceeds a threshold, the algorithm may declare a CC based on the pixels already identified as forming a cluster, and subsequently the algorithm may be started on a new cluster. In an embodiment, the threshold can be set at 3000 calls deep. For example, if a set of touching red pixels contains 5000 pixels, block 204 may identify a CC based on 3000 of those pixels, then identify a separate CC based on the remaining 2000 pixels. FIG. 4A depicts an example of a cluster containing a large number of touching pixels. In FIG. 4A, each square represents a suitably large number of pixels. Upon reaching a size limit in filling the first cluster CC1, the flood fill algorithm can proceed to create a second cluster CC2. After the CC's are identified, they can then be associated with corresponding CCR's as described earlier.

Figure 5:
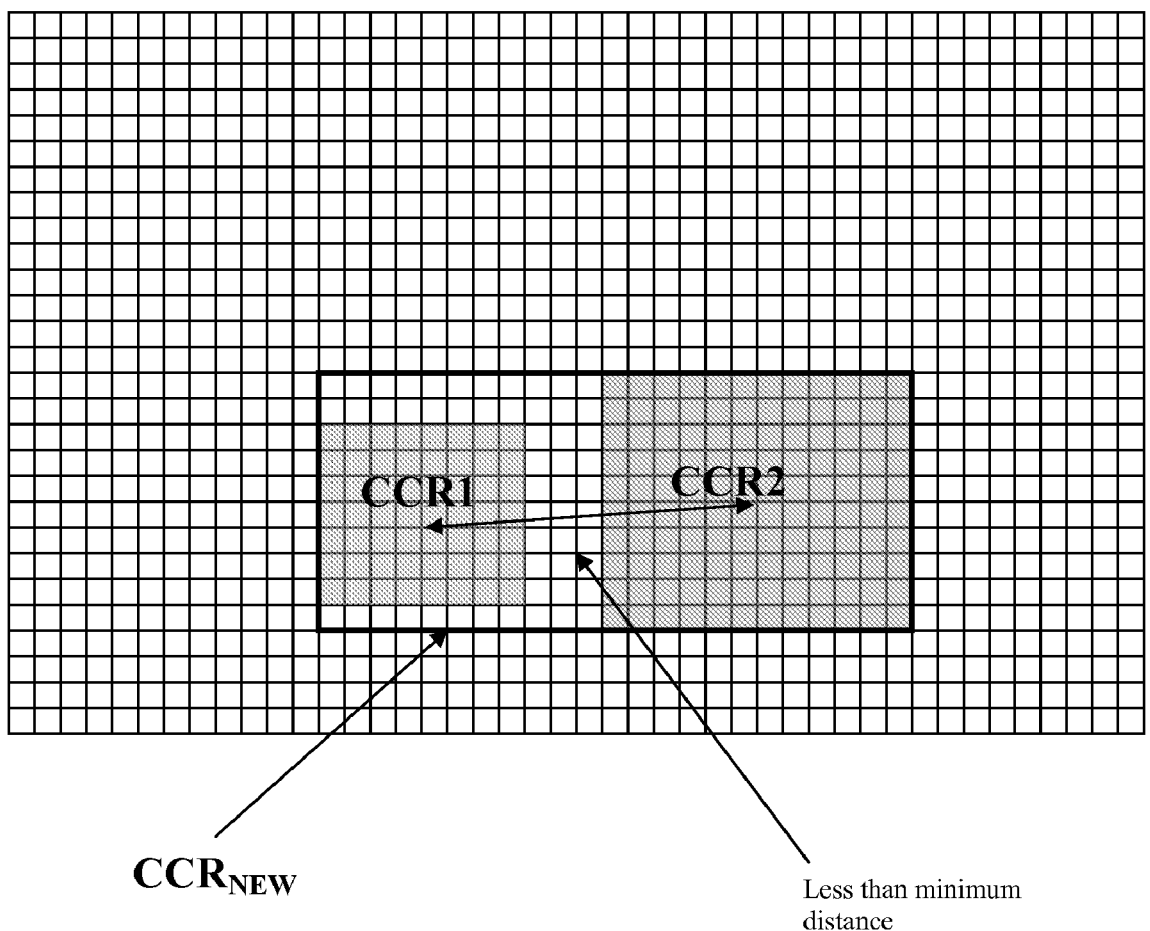
FIG. 5 illustrates an embodiment wherein a first CC (CC1) and a second CC (CC2) are within a minimum threshold distance from each other.

Block 206 identifies a CCR that is within some threshold distance to another CCR, and combines those CCR's to form a new composite CCR. In an embodiment, the distance between CCR's is defined as the distance between the center of one CCR and the center of another CCR. In an embodiment, 12 pixels can be used as the threshold distance. In other embodiments, any other measure and/or threshold for distance may be defined. For two CCR's that are determined to be close to each other, a new CCR can be defined that is the minimum-sized rectangle that encloses both of the previous CCR's, and the previous CCR's are eliminated. FIG. 5 illustrates an embodiment wherein a first CC (CC1) and a second CC (CC2) are within a minimum threshold distance from each other. Here, the distance between the CC's is measured as the minimum distance between the centers of each CC. CCR1 and CCR2 are eliminated and replaced by a $CCR_{NEW}$ that encloses both CCR1 and CC2.

Block 208 identifies any CCR that has at least one pixel overlapping with another CCR. In an embodiment, for any CCR that overlaps another CCR, the smaller of the two CCR's is eliminated. In other embodiments, a new CCR can be defined that encloses a set of CCR's that share overlapping pixels.

Block 210 removes CCR's that have shapes and/or sizes that make them unlikely to be images of pupils. In an embodiment, block 210 removes CCR's having a total size (e.g., total number of pixels) less than 3 pixels or greater than $((image\_width/256)*6)^2$, where image_width is a width of the total image in pixels. Also, block 210 can remove any CCR larger than 2000 pixels, wherein the CCR also has an aspect ratio (i.e., length divided by height) less than 0.5 or greater than 2.4. In other embodiments, other limits for sizes may be defined. In other embodiments, alternative metrics may be used to identify any other unlikely shapes, sizes, and/or dimensions.

Block 212 expands each CCR into a region known as a Red Eye Candidate (REC). In an embodiment, the expansion of a CCR into an REC is done to extract additional information from the region surrounding the identified red pupils, including areas associated with the iris, the sclera, and the surrounding skin. In an embodiment, the expansion can be done according to a look-up table as follows:

TABLE 3

| | Maximum of CCR width and height (in pixels) | | | | | | | |
| --- | --- | --- | --- | --- | --- | --- | --- | --- |
| | 1 | 2 | 3 | 4 | 5 | 6 | 7 to 15 | 16 to 28 | 29 and above |
| Expansion multiplier | 16 | 16 | 13 | 10 | 8 | 7 | 5 | 4 | 3 |

Figure 5A:
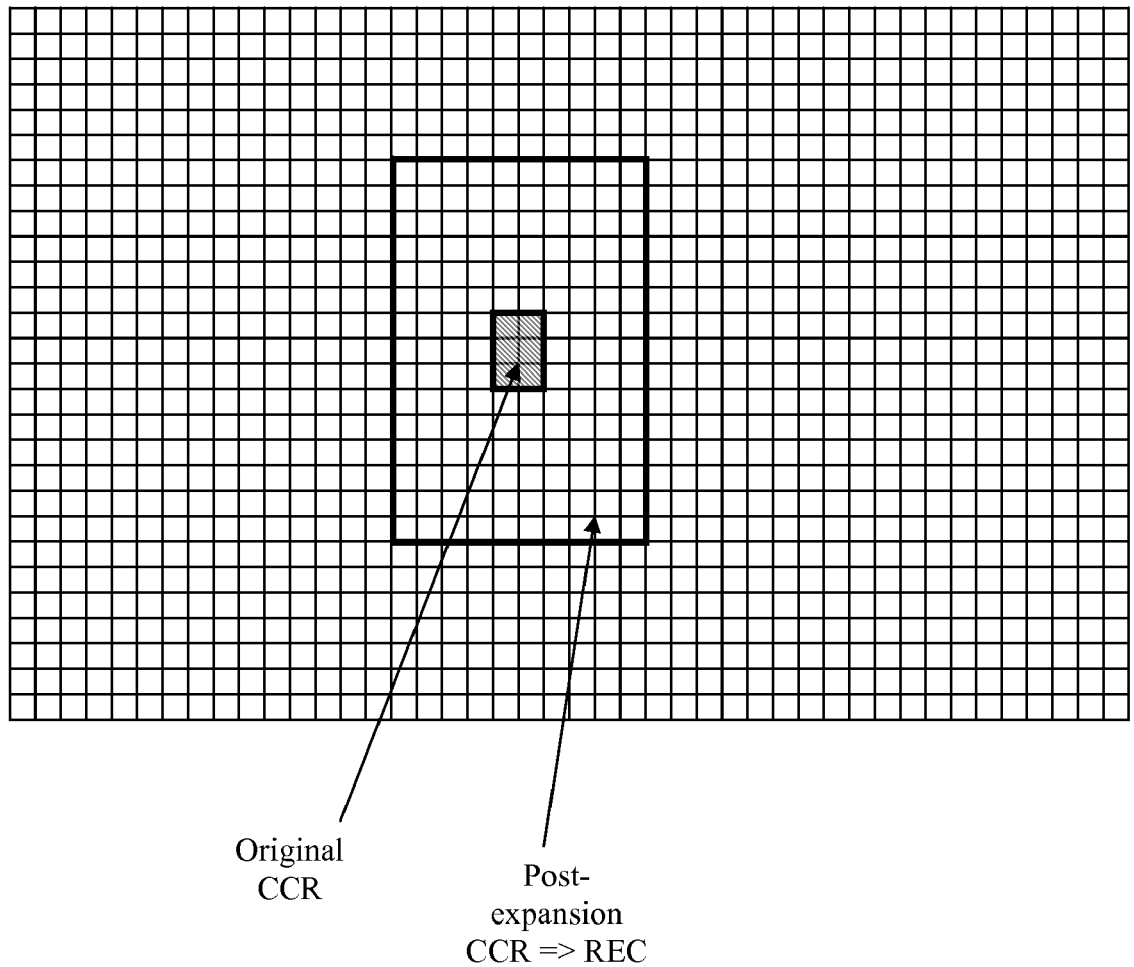
FIG. 5A illustrates an exemplary embodiment wherein a post-expanded REC includes a pre-expanded CCR at its center.

In the look-up table above, the maximum of a CCR's width and height in pixels determines a multiplier that is multiplied to the dimensions of the CCR to expand the size of the CCR into an REC. For example, a CCR having a width of 2 and a height of 4 will be expanded into an REC having a width of 20 and a height of 40 (i.e., both dimensions multiplied by 10) according to the look-up table. In an embodiment, the post-expanded REC may include the pre-expanded CCR at its center, as depicted in FIG. 5A. Note the expansion shown in FIG. 5A is not done according to the expansion multipliers given in the table above, and is given only to illustrate the expansion of a CCR to an REC. In general, alternative multipliers may be substituted for those given in the look-up table above. Note alternative embodiments may employ functional mappings between CCR and REC other than those given in the table above. Such functions may be implemented using look-up tables or any other computational methods.

Block 214 searches an area suitably larger than an REC to detect if there is skin surrounding the REC. If there is not enough skin detected around the REC, the REC may be eliminated. This operation is based on an assumption that legitimate instances of red-eye will likely be surrounded by skin. In an embodiment, for each REC, the block can search an enlarged area four times larger than that REC (centered on that original REC), and remove any REC whose enlarged area contains a proportion of skin pixels less than 4/9. Other embodiments may define alternative search areas and skin detection thresholds. In an embodiment, skin pixels can correspond to those identified from the skin-tone detection block 202.

After expansion of CCR's to REC's, a series of statistics can be collected from the remaining REC's that provide information on the likelihood that a particular REC is a legitimate instance of red-eye. In an embodiment, a set of statistics may be defined with reference to an eye region (ER), pupil region (PR), iris region (IR) and sclera region (SR).

In this specification and in the claims, the ER is defined to be the entire set of pixels associated with an REC. The PR is defined to be an innermost subset of the pixels in an REC. The IR is defined to be a region that completely surrounds the PR. The SR is defined to be a region that completely surrounds the IR. In an embodiment, the union of the PR, IR, and SR form the ER, i.e., the PR, IR, and SR are non-overlapping, and they collectively account for all the pixels within the ER. In another embodiment, the PR may overlap slightly with the IR, and the IR may overlap slightly with the SR. In yet another embodiment, there may be a gap between the border of the PR and the inner border of the IR, and/or a gap between the outer border of the IR and the inner border of the SR, and/or a gap between the outer border of the SR and the border of the ER. Note the ER, PR, IR, and SR may generally have any shape, regular or irregular, and need not be limited to having the shapes specifically disclosed herein.

Figure 6:
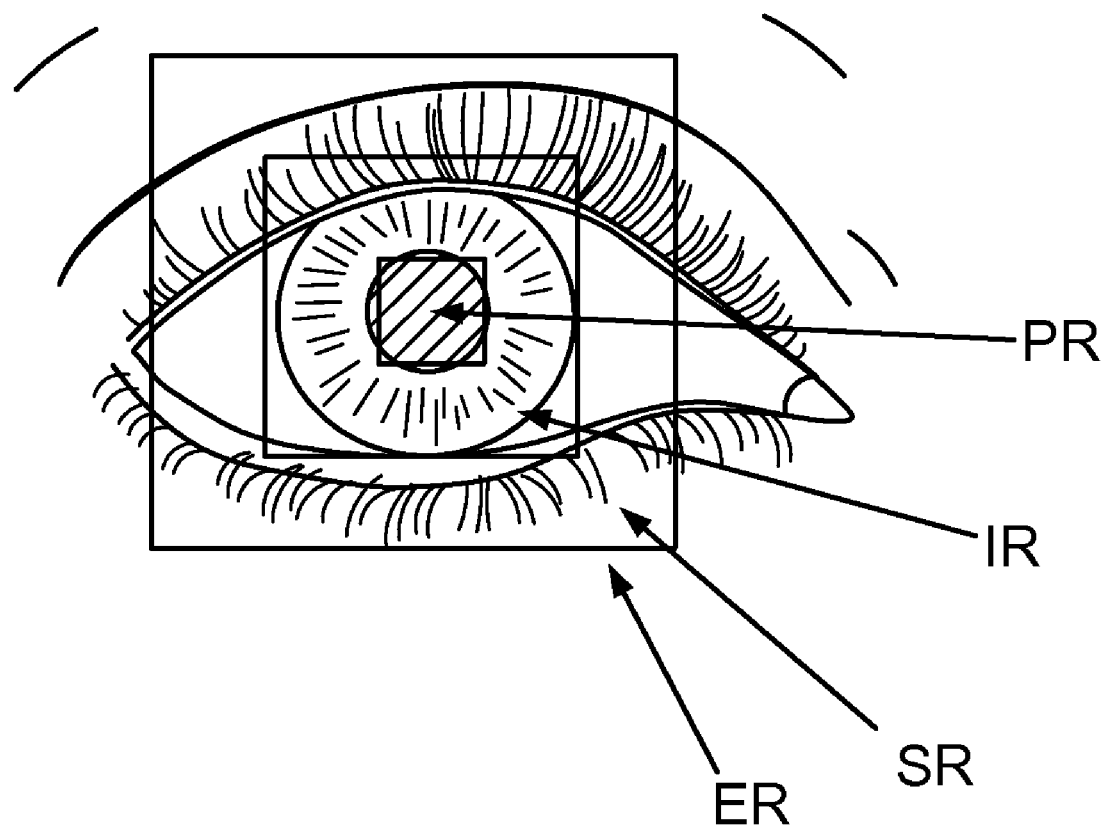
FIGS. 6-6D illustrate an embodiment of the various regions defined herein.
Figure 6A:
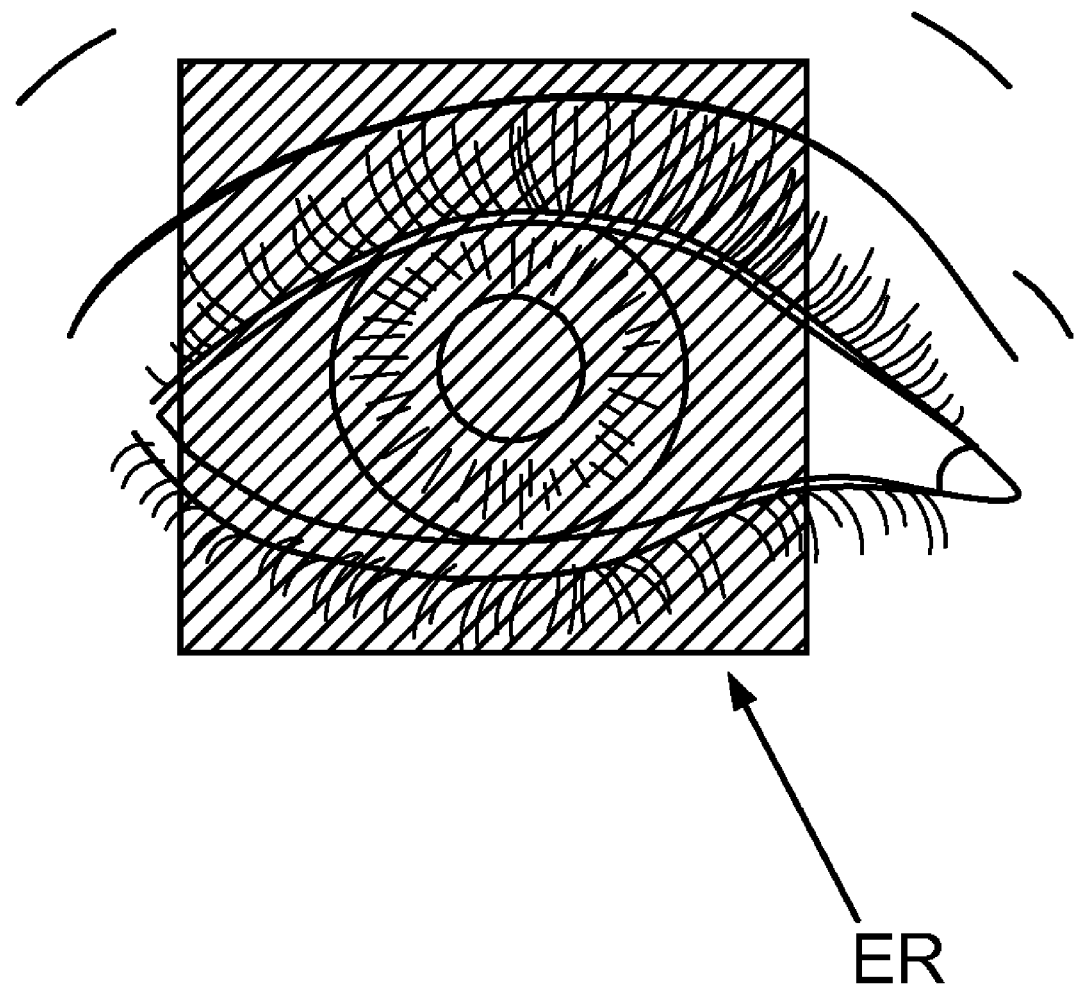
Figure 6B:
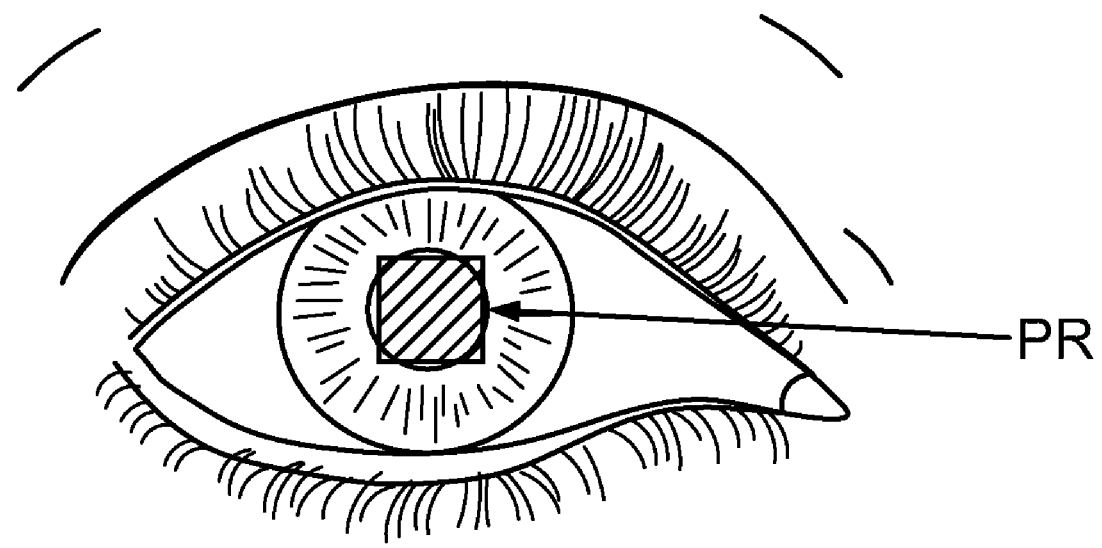
Figure 6C:
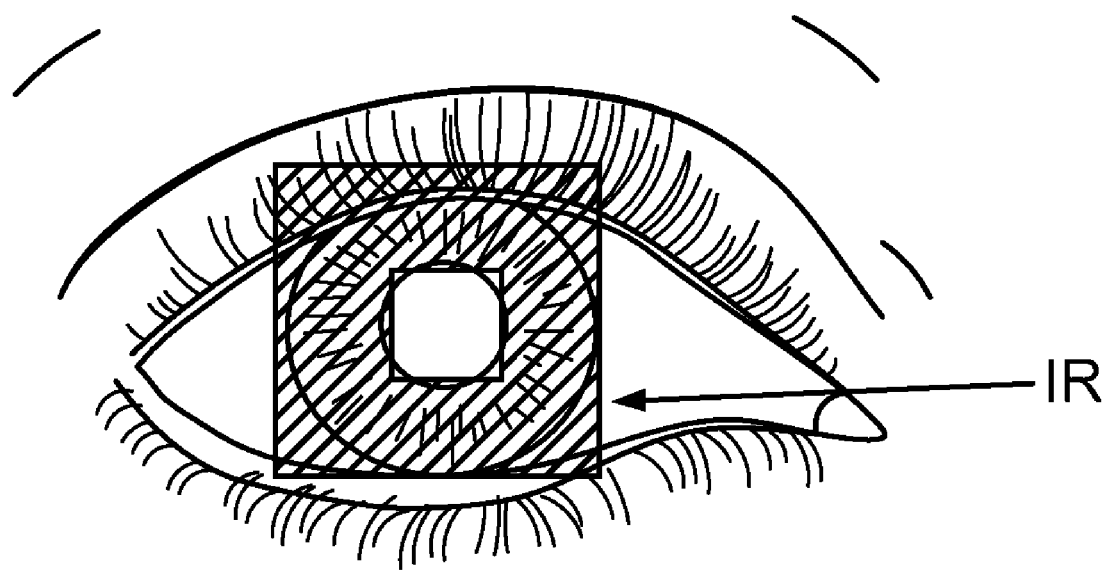
Figure 6D:
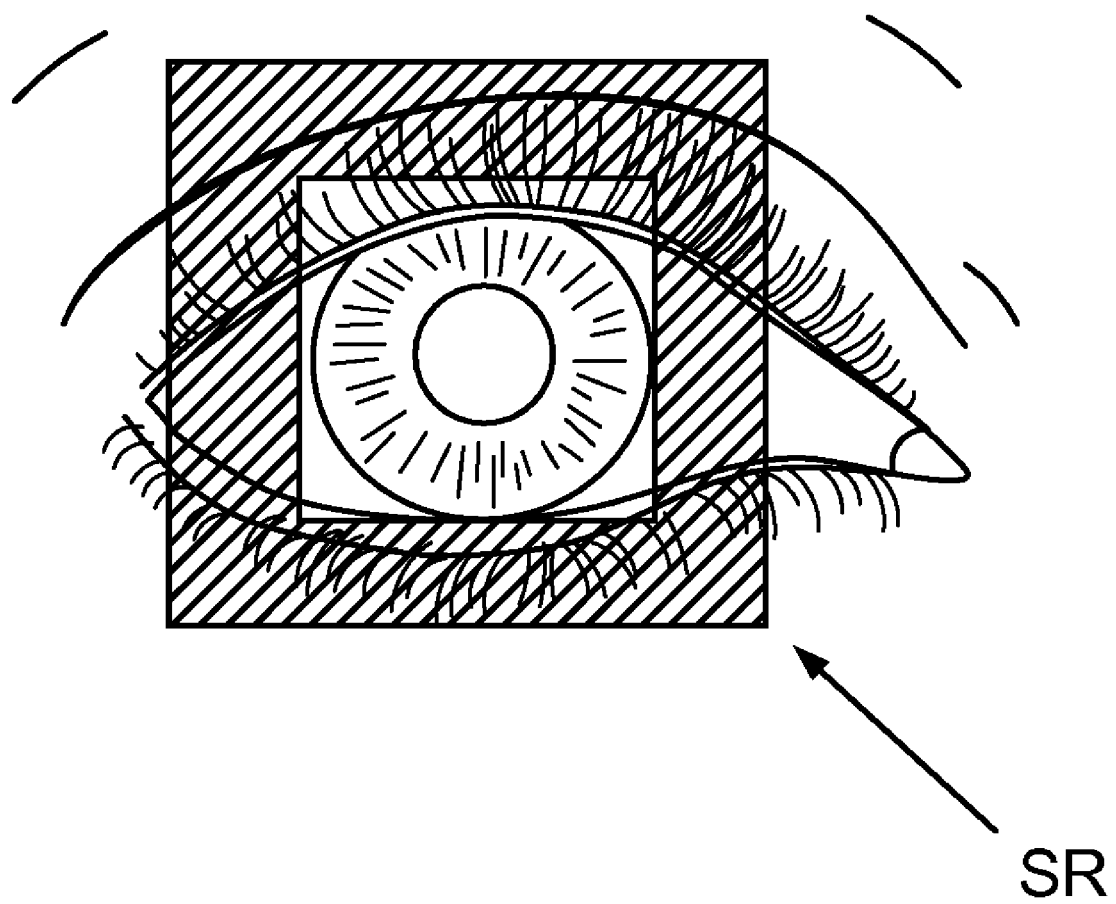

FIG. 6 illustrates an embodiment of the various regions defined. Note FIGS. 6-6D and the accompanying descriptions are provided for illustrative purposes only, and are not meant to limit the definitions of the four regions as given above. As depicted in FIG. 6A, an eye region (ER) may generally cover one eye region of the human face, preferably including most of the bottom and top eyelid. As depicted in FIG. 6B, the pupil region (PR) may generally cover the pupil of an eye, and may contain pixels having colors associated with pupils such as blue, brown or green, as well as the target color to be corrected. As depicted in FIG. 6C, the iris region (IR) may generally contain the iris of the eye, and may cover the portion of the eye where light from the camera flash is absorbed. The IR may contain the color black, as well as red due to reflection from the cornea. As depicted in FIG. 6D, a sclera region (SR) may generally cover only the white portion of the eye. The SR may also cover some part of the upper or lower eyelids.

Figure 7:
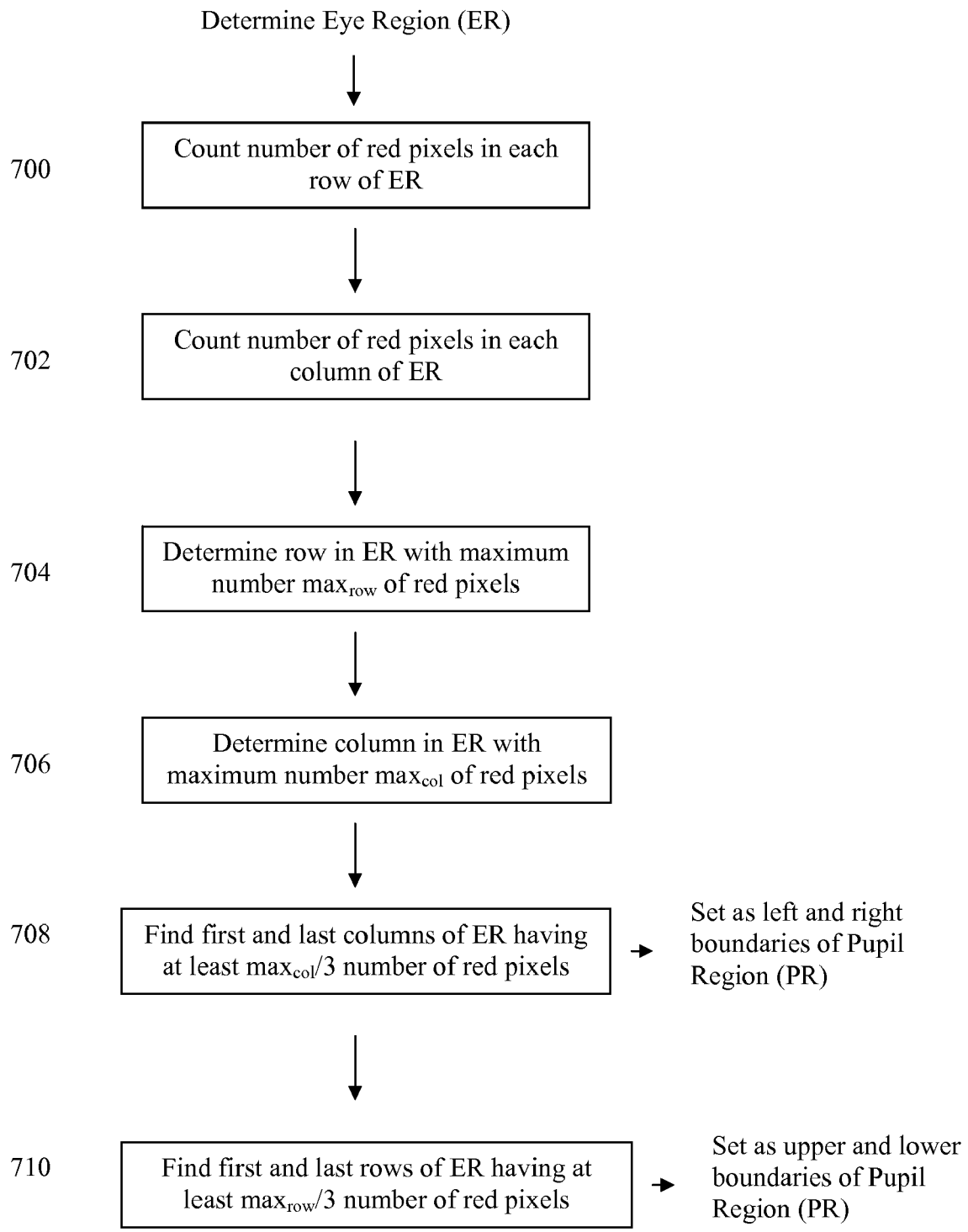
FIG. 7 depicts how a pupil region (PR) and iris region (IR) can be defined from an eye region (ER) according to an embodiment.

In a specific embodiment, the definitions of the PR and IR may be further refined, with reference to FIG. 7. First, for each row of the ER, count the number of red pixels present in each row, as shown in block 700. This constitutes a one-dimensional projection of the red pixels in the ER along each row of the y- (or vertical) axis. Next, for each column of the ER, count the number of red pixels present in each column, as shown in block 702. This is a one-dimensional projection of the red pixels in the ER along the columns of the x- (or horizontal) axis. For the y-axis projection, find the row having the maximum number of red pixels, and denote the number of pixels in that row as $\max_{rows}$, as shown in block 704. For the x-axis projection, find the column having the maximum number of red pixels, and denote the number of pixels in that column as $\max_{cols}$. Divide $\max_{rows}$ by 3, and $\max_{cols}$ by 3, to obtain $\max_{rows}/3$ and $\max_{cols}/3$, respectively. Note alternative embodiments may utilize any divisor other than 3.

In an embodiment, the borders of the PR may then be defined as follows. The PR may be bounded on the top by the first row (counting from the top row of the ER) having a number of red pixels equal to or greater than the number $\max_{rows}/3$ previously computed. Similarly, the PR may be bounded on the bottom by the last row (counting from the top row of the ER) having a number of red pixels equal to or greater than the number $\max_{rows}/3$ previously computed. The PR may be bounded on the left by the first column (counting from the leftmost column of the ER) having a number of red pixels equal to or greater than the number $\max_{cols}/3$. Similarly, the PR may be bounded on the right by the last column (counting from the leftmost column of the ER) having a number of red pixels equal to or greater than the number $\max_{cols}/3$.

Figure 8:
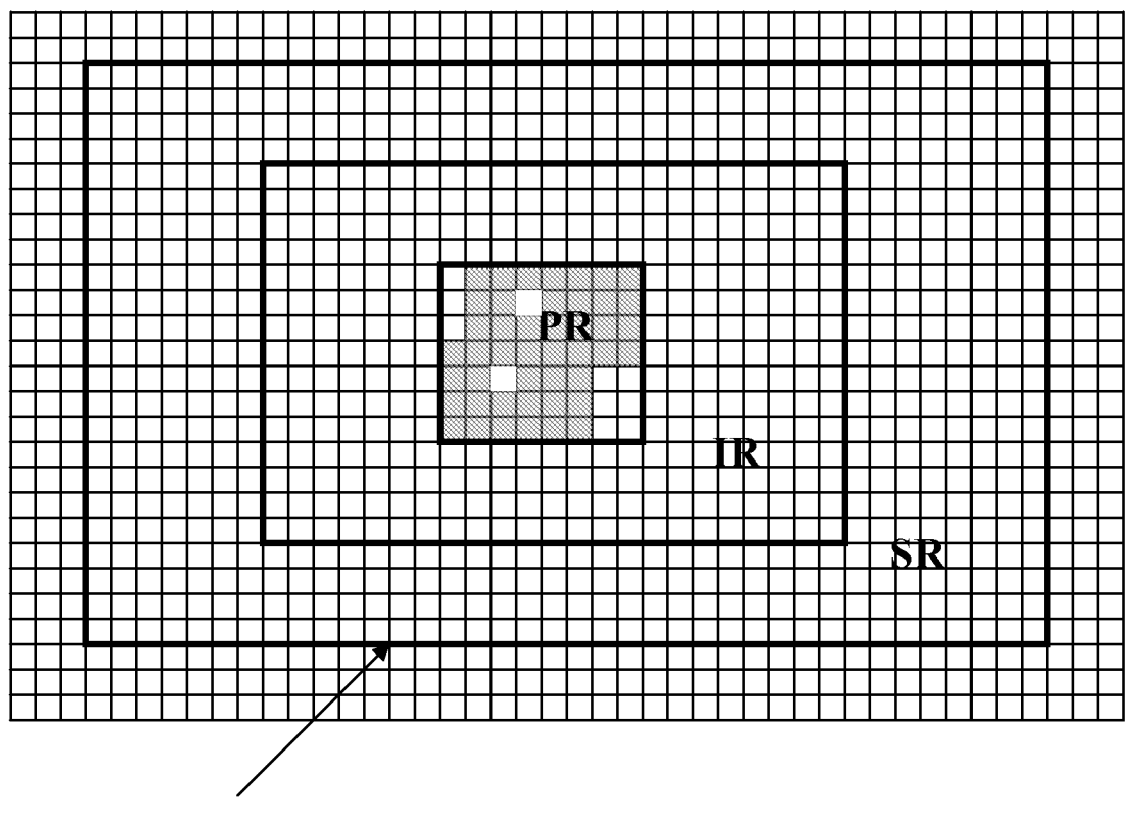
FIG. 8 depicts the various regions with reference to underlying pixels.

FIG. 8 depicts the various regions with reference to underlying pixels. In an embodiment, the borders of the IR may be determined as follows. According to FIG. 8, which shows a PR already defined, the IR's inner border may be taken to be the set of pixels surrounding the outer border of the PR. The IR's outer border may be defined as the set of pixels located halfway (or approximately halfway) between the borders of the PR and the ER. Note alternative embodiments may define the IR differently, for example, as being closer to or farther away from the PR and ER borders than described herein.

In an embodiment, the SR may be defined as the region between the outer border of the IR and the border of the ER, as shown in FIG. 8.

In another specific embodiment, the PR, IR, and SR can be defined based on "weighted" versions of the number of red pixels counted in each row and column. This may, for example, serve to emphasize finding convex hulls of reds about a center of the ER, as opposed to the entire ER. In an embodiment, the count of red pixels for each row and column may be initialized with negative numbers that decrease in value (i.e., become more negative) away from the center. This initialization effectively assigns greater weight to red pixels near the center of the ER than to red pixels at the periphery of the ER, which may be present due to non-red-eye related effects such as, for example, excessive sun exposure or alcohol consumption. In an embodiment, the counts may be initialized with any numbers (negative and/or non-negative) that decrease in value away from the center.

Based on a defined ER, PR, IR, and SR for each REC, a series of statistics can be defined to gather further information on whether the REC is a legitimate instance of red-eye. Note various embodiments may utilize all or only a subset of the statistics disclosed. The information derived from each statistic may be quantified, weighted, and/or summed to obtain an aggregate statistic or statistics used for further processing. Note alternative embodiments may define the ER, PR, IR and SR in ways other than according to the specific embodiment as given in the refined definition above. Such alternative embodiments may apply the statistics herein described in altered form, for example by varying the thresholds and/or metrics associated with the statistics.

In an embodiment, the statistics can be characterized as a series of tests based on the likely properties of an REC containing red-eye. In an embodiment, for every REC that fails one of these tests, a number of failed match points (FMP's) may be accumulated for that particular REC. The net accumulated FMP's for each REC may be used to indicate how likely the REC is to contain red-eye. In an embodiment, the greater the number of FMP's for an REC, the less likely the REC is to contain red-eye. Note alternative embodiments may assign different weights to the result of each test than those given herein, e.g., by accumulating different numbers of FMP's for failing each test.

In an embodiment, the statistics collected can relate to the distribution of colors within a region that contains the REC. In an embodiment, the presence of four types of colors may be determined in each REC: skin, red, glint, and other-color (or "OC," corresponding to pixels that are not skin, red, or glint). In an embodiment, the numbers of red, skin, glint and OC pixels in the PR, IR, SR, and ER of each REC are counted. In an embodiment, the ranges of colors for skin and red may be as defined earlier in Tables 1 and 2, respectively. In an embodiment, the range of colors for glint may be any HSV pixel having S equal to or less than 100 (on an 8-bit scale), as well as having V equal to or greater than 190. The collection of color distribution statistics is depicted in block 216 of FIG. 3A, which is a continuation of FIG. 3.

Described herein is an embodiment wherein a series of tests may be used to gather information on the presence of red-eye in an REC. If an REC fails a particular test, a number of failed match points (FMP's) may be accumulated to a running total associated with that REC. Note various embodiments may employ some or all of these tests, and may also employ other statistics not explicitly described herein. Various embodiments may perform the tests using other thresholds, weights, multipliers, factors, and weights (e.g., number of FMP's accumulated) than those disclosed for the exemplary embodiments. Note that the tests are not meant to be interpreted as absolute statements about the characteristics of legitimate instances of red-eye. Rather, they are intended to provide a number of metrics to help assess whether an REC is more or less likely to be a legitimate instance of red-eye. Note the descriptors "first, second, third, etc.," for the tests are used solely as identifiers, and are not meant to imply that any test must be followed by any other test in a preferred sequence, or that an embodiment must apply any particular number of these tests.

According to a first test, a pupil that is too small in size is unlikely to be an instance of red-eye needing correction. In an embodiment, if the number of pixels in a PR is less than 16, accumulate 3 FMP's.

According to a second test, the border of an IR should be separated from the border of an SR by some minimum distance. In an embodiment, if a border of an IR is less than n pixels from a border of a corresponding SR, where n is defined as max (3, width of SR/7), then instantly disqualify the REC, e.g., accumulate a maximum number of FMP's that automatically fails the REC. Other embodiments may define n in other ways.

According to a third test, the PR likely has an aspect ratio, i.e., length divided by height, that falls within a predetermined range. In an embodiment, if the PR's aspect ratio is not within certain look-up-table (LUT)-based tolerances, then accumulate 2 FMP's. In an embodiment, the LUT is as given below.

TABLE 4

| Size Of PR (# of pixels) | Min Aspect Ratio | Max Aspect Ratio |
|---|---|---|
| <299 | 0.20 | 5.0 |
| 300-399 | 0.30 | 4.0 |
| 400-2600 | 0.40 | 3.0 |
| 2700-2899 | 0.45 | 2.5 |
| >2900 | 0.45 | 2.0 |

According to a fourth test, the ER should contain some minimum proportion of skin pixels. In an embodiment, if the number of skin pixels in an ER is less than 27% of all pixels in the ER, then accumulate 3 FMP's.

According to a fifth test, the skin pixels in the ER should be found mostly in the SR. In an embodiment, the number of skin pixels in the SR is divided by the number of skin pixels in the ER. If the quotient is less than 0.44, accumulate 3 FMP's.

According to a sixth test, the number of skin pixels in the PR should be proportionately low as compared to the ER. In an embodiment, the number of skin pixels in the PR is divided by the number of skin pixels in the ER. If the quotient is greater than 0.01, accumulate 3 FMP's.

According to a seventh test, if the number of skin pixels in the PR is greater than half the number of red, glint, and OC pixels in the PR, then accumulate 3 FMP's.

According to an eighth test, the OC pixels in the SR should number no more than a certain factor times the number of OC pixels in the PR and IR combined. In an embodiment, if the number of OC pixels in the SR is greater than four times the number of OC pixels in the PR and IR, then accumulate 3 FMP's.

According to a ninth test, there should be comparatively more red and glint than OC pixels in the PR. In an embodiment, if the number of OC pixels in the PR is greater than 3/2 times the number of red and glint pixels in the PR, accumulate 1 FMP.

According to a tenth test, there should be some significant number of red pixels in the PR in a legitimate instance of red-eye. In an embodiment, if the number of pixels in the ER is greater than 400, then there should be at least 20 red pixels in the PR. Otherwise, accumulate 2 FMP's.

According to an eleventh test, there should be some significant number of red pixels in the PR. In an embodiment, this test is only applied if the PR size is larger than a threshold. In an embodiment, if the number of pixels in the PR is greater than 200, and the number of red pixels in the PR divided by the number of pixels in the PR is less than 40%, then accumulate 1 FMP.

According to a twelfth test, the red and glint pixels in the PR should account for most of the pixels in the PR. In an embodiment, this test is only applied if the PR size is larger than a threshold. In an embodiment, if the number of pixels in the PR is greater than 200, and the number of red, glint pixels in the PR divided by the number of pixels in the PR is less than 80%, then accumulate 1 FMP.

According to a thirteenth test, the red pixels in the PR should account for some sizable portion of the total red pixels in the ER. In an embodiment, if the number of red pixels in the PR is less than the number of red pixels in the ER divided by 3, accumulate 1 FMP.

According to a fourteenth test, there should be fewer red pixels in the IR than in the PR. In an embodiment, if the number of red pixels in IR is greater than the number of red pixels in PR, accumulate 1 FMP.

According to a fifteenth test, there should be more red pixels in the PR than in the IR and SR combined. In an embodiment, if the number of red pixels in the PR is less than one-third of the number of red pixels in the IR and SR combined, then accumulate 3 FMP's.

According to a sixteenth test, the glint and OC pixels in the PR and IR should account for some minimum number of the total pixels in the PR and IR. In an embodiment, if the number of glint, OC pixels in the PR and IR divided by the number of pixels in the PR and IR combined is less than 3%, accumulate 1 FMP.

According to a seventeenth test, there should be some minimum number of glint pixels present in the PR and IR. Glint is caused by the reflection of the camera's flash from a pupil. In an embodiment, if the number of glint pixels in PR and IR is less than 3, accumulate 2 FMP's.

According to an eighteenth test, the number of glint pixels should not exceed some maximum. In an embodiment, if the number of glint pixels in the ER is greater than eight times the number of red pixels in the ER, accumulate 2 FMP's.

According to a nineteenth test, for some suitably large ER, there should be at least a certain number of glint pixels in the PR and IR. In an embodiment, if the number of pixels in the ER is greater than 10,000, and the number of glint pixels in the PR and IR is less than 25, accumulate 2 FMP's.

When FMP's for a predetermined set of tests are accumulated for each REC, the cumulative FMP's for each REC can be compared against a threshold to determine whether the REC will be eliminated as a candidate. In an embodiment wherein all the tests disclosed herein are used to accumulate FMP's, a threshold of 2 can be used. In alternative embodiments, where information collected from color distribution statistics are quantified, weighted, and/or accumulated according to a different scheme, a different threshold can be chosen to eliminate REC's from consideration.

Figure 3A:
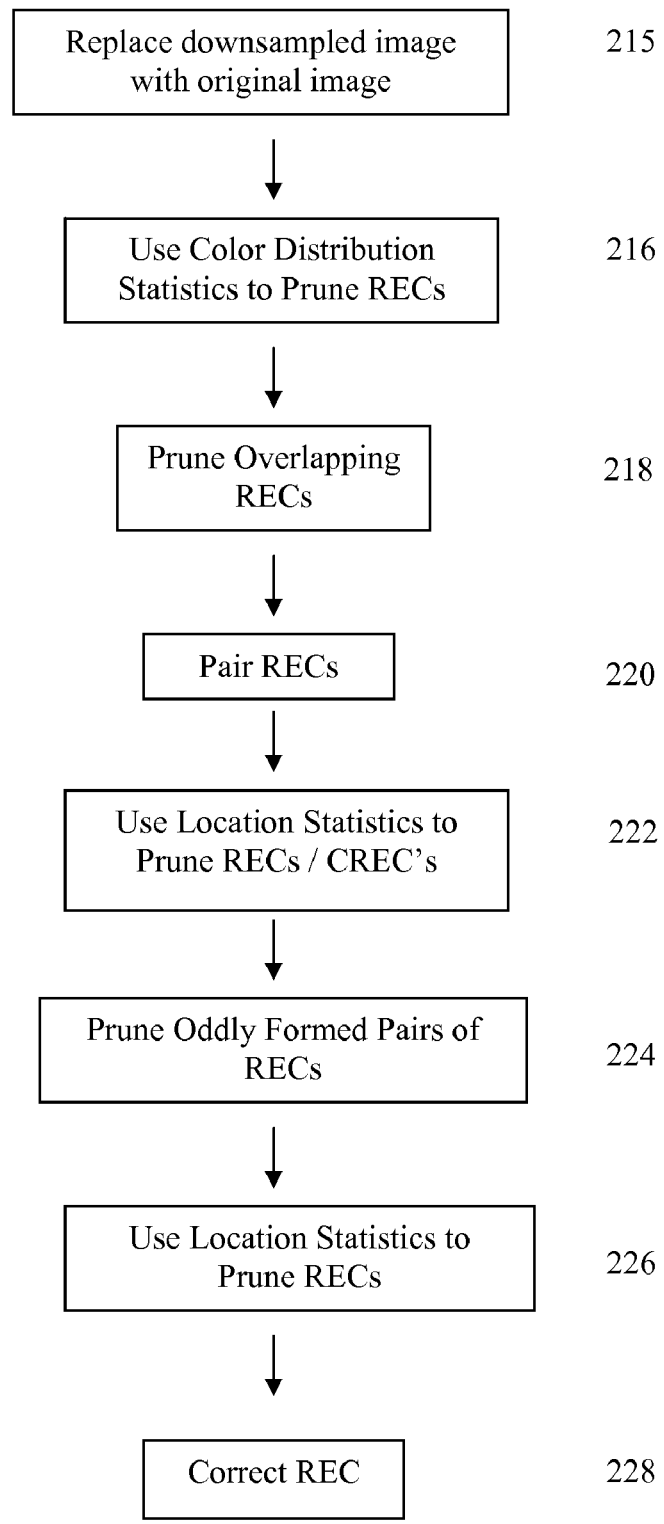

In an embodiment, to increase the accuracy of the color distribution statistics, the operations starting from block 216 in FIG. 3A can be performed on the full, non-subsampled, digital image, as opposed to the subsampled version. This is represented as block 215 in FIG. 3A. Note the boundaries and locations of the REC's (possibly determined based on the subsampled image) may need to be redrawn and resealed accordingly to correspond to the non-subsampled image. Note that other embodiments may continue to perform operations on the subsampled image following block 216, or on an image subsampled by a different factor. In general, switching between a subsampled and non-subsampled image for processing is a trade-off between accuracy and computational complexity. In some embodiments, the switching can be performed at any stage of the embodiment depicted in FIGS. 3, 3A, and also at any stage of other embodiments not depicted in FIG. 2 or 3, 3A. Switching can also be done from a non-subsampled image to a subsampled image for particularly computationally intensive stages.

Referring back to FIG. 3A, block 218 identifies REC's that overlap one or more other REC's remaining after eliminating color distribution statistics. Block 218 eliminates the overlapping REC with the higher or highest accumulated value of FMP's. In an embodiment, if two (or more) such REC's have the same value of FMP's, then the one positioned lower (or lowest) in the image can be eliminated.

Block 220 identifies a Complementary REC (CREC) for each REC. This is based on the assumption that instances of red-eye likely appear in pairs. In an embodiment, a CREC is chosen for each REC. To choose a CREC, a bad match metric (BMM) can be computed between each REC and every other REC. In an embodiment, a BMM can be computed as a weighted sum of several factors. One factor may be the slope between an REC and a candidate CREC. In an embodiment, the slope between two REC's can be computed as the slope of a line connecting corresponding points on the two REC's, e.g., the top-leftmost corners. Another factor may be the distance between the centers of the REC and the candidate CREC. Another factor may be the FMP value of a candidate CREC. Another factor may be the size differential between the REC and a candidate CREC. Another factor may be whether the candidate CREC has had the opportunity to find its own CREC, and if so, whether the candidate CREC chose the REC under examination as its CREC. In an embodiment, weights are assigned to each of these factors to obtain a BMM for each candidate CREC. The candidate CREC with the lowest BMM is selected as the CREC for the REC. Note in other embodiments, fewer or more criteria may be used to compute the BMM for a candidate CREC.

In an embodiment, the above factors may be combined as follows to yield a single $BMM_{C1-C2}$, the BMM between REC (C1) and a candidate CREC (C2):

$$BMM_{C1-C2} = [1 + 1000 * (slope_{C1-C2})] * dist_{C1-C2} * sizeDiff_{C1-C2} * FMPdiff_{C1-C2};$$

where $slope_{C1-C2}$ is the slope between C1 and C2;
$dist_{C1-C2}$ is the absolute distance between C1 and C2;
$sizeDiff_{C1-C2}$ is the absolute difference in size between C1 and C2; and
$FMPdiff_{C1-C2}$ is the absolute difference in FMP values between C1 and C2.

In an embodiment, the computed $BMM_{C1-C2}$ is then further discounted by 10% if C2's computed CREC happens to be C1. In an embodiment, $sizeDiff_{C1-C2}$ can be computed by dividing the size of the larger of C1 and C2 by the size of the smaller of C1 and C2. Note the BMM computation above is given for illustrative purposes only. Other embodiments may alternatively combine the factors disclosed to compute other BMM's.

In an embodiment, once a CREC has been identified for every REC, then the following assumptions may be tested. First, it is assumed that an REC should be paired up with a CREC that considers that REC to be its CREC, i.e., a reflexivity assumption. In an embodiment, if an REC's CREC's CREC is not the original REC, then eliminate that REC if its FMP is above some threshold. In an embodiment, the threshold is 2. Second, if the reflexivity assumption holds for an REC-CREC pair, then test further assumptions to make sure the pairing is feasible. According to one assumption, an REC should not be located too far away from its CREC in an image. In an embodiment, the REC and its CREC can be tested to make sure they are not more than five times further apart than the shorter of their two widths. According to another assumption, the size differential between an REC and its CREC should not be great. In an embodiment, the REC's in an REC-CREC pair can be tested to make sure neither has a size three times greater than the other. Third, if an REC is left without a CREC after testing the above assumptions, then eliminate the REC if its FMP is above some threshold. In an embodiment, the threshold may be 2. Note in an embodiment, the assumptions disclosed in this paragraph need not be tested separately from the computation of the BMM. The assumptions can also be incorporated in the computation of the BMM itself.

Figure 9:
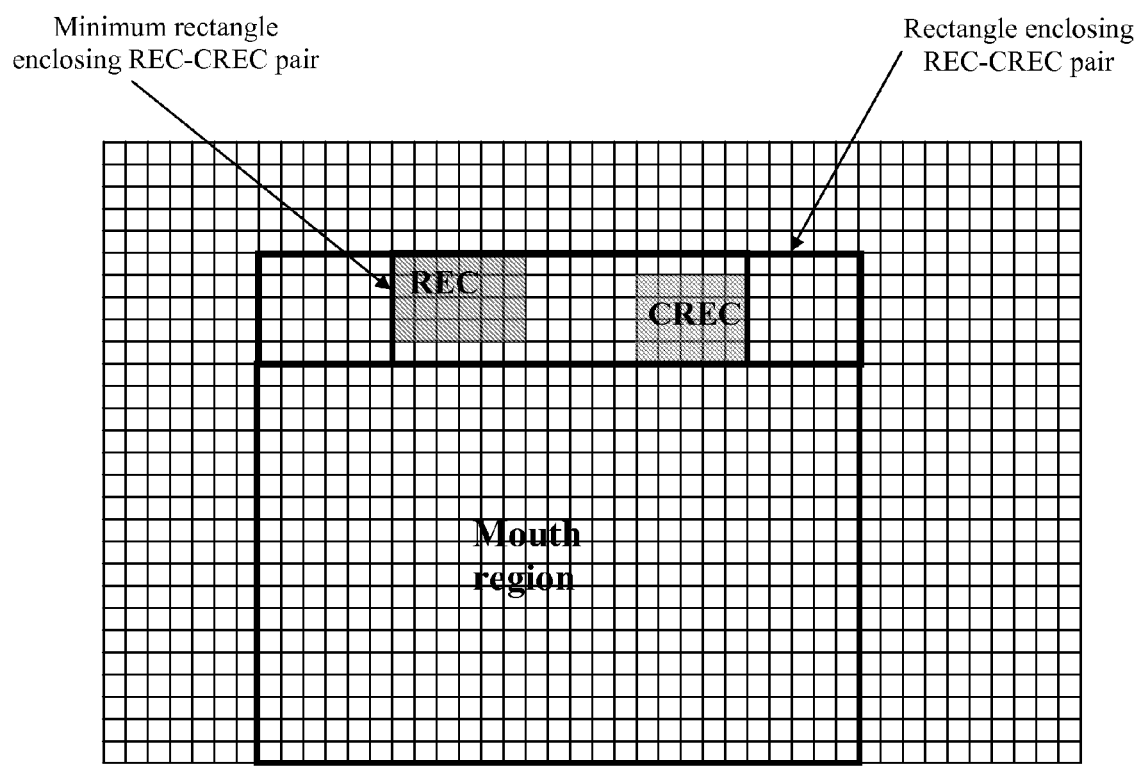
FIG. 9 shows a mouth region of an REC-CREC (Red-Eye Candidate-Complementary Red-Eye Candidate) pair.

Block 222 eliminates REC-CREC pairs based on their locations relative to other pairs. In an embodiment, for every REC-CREC pair, determine a minimum FMP of the pair. For each pair, the minimum FMP of the pair may be defined as min (FMP of REC, FMP of CREC), and can be referred to as topFMP. Then, identify a "mouth" region spatially beneath the REC-CREC pair. In an embodiment, the mouth region of an REC-CREC pair can be defined as the entire set of pixels in the image spatially beneath a rectangular box that entirely encloses the pair. In an embodiment, the rectangular box is defined as the minimum-sized rectangle entirely enclosing the REC-CREC pair, plus two width adjustments. In the first width adjustment, the left side of the minimum-sized rectangle is further extended to the left by an amount equal to the width of the leftmost candidate of the REC-CREC pair. In the second width adjustment, the right side of the minimum-sized rectangle is further extended to the right by an amount equal to the width of the rightmost candidate of the REC-CREC pair. FIG. 9 depicts a mouth region defined according to such an embodiment. Alternative embodiments may define the mouth region in other ways.

In an embodiment, for any REC that lies fully within the mouth region, eliminate the REC lying in the region and its respective CREC if the minimum FMP of the REC-CREC lying in the mouth region, known as botFMP, is more than or equal to topFMP. If, however, botFMP is less than topFMP, eliminate the REC-CREC that was used to create the mouth region, i.e., the pair associated with topFMP.

Block 224 further eliminates REC's if their size is significantly different from an average REC size, computed over all non-eliminated REC's. This is based on the assumption that the size of all legitimate REC's in a photo should be similar. In an embodiment, REC size is computed as the width times height. In an embodiment, REC's are eliminated if their size is greater than three times the average REC size, or less than one-third the average REC size. In an embodiment, the eliminated REC's CREC is also eliminated. Note this block can be run multiple times until there are no more REC's to be eliminated.

Block 226 eliminates REC's that are not within some minimum vertical distance of the REC in an image having minimum FMP. This is based on the assumption that any occurrence of red-eye in an image will generally be vertically close to other occurrences of red-eye. In an embodiment, REC's are eliminated that are not within +/− imageHeight/4 of the vertical position in the image of the REC with the lowest FMP score, where imageHeight is the height of the image in pixels. In an embodiment, if there is more than one REC having a lowest FMP, the REC positioned higher in the image may be chosen to break the tie.

Block 228 assumes that the remaining REC's contain legitimate red-eye, and proceeds to correct the pixels in the REC's by adjusting their color. Note once a legitimate REC has been identified, any suitable algorithm may be applied to correct its color. In an embodiment, the colors are adjusted as follows. All pixels in a remaining REC's PR and IR are color adjusted, except for glint pixels that commonly correspond to the reflection of camera flash. In an embodiment, HSV pixels may be adjusted as follows:

$$Saturation_{new} = P_{red} * Saturation_{old} + (1 - P_{red}) * Saturation_{old}/2;$$

where $Saturation_{old}$ and $Saturation_{new}$ are the saturation of the pixel before and after adjustment, respectively; and $P_{red}$ is the percentage of red pixels identified in a neighborhood of the pixel of interest. In an embodiment, the neighborhood may be a 9 pixel by 9 pixel square centered on the pixel of interest. For example, if the pixel under investigation has HSV color values of (9, 150, 200), and there are 34 out of 81 red pixels in a 9×9 square search space around the pixel, then the new value for the pixel would be 107, computed as 42% (or $34/81$) times the original saturation of 150, added to 58% (or $47/81$) times 75, which is the original saturation cut in half. The lower saturation value tends to make the reddish pixel less red.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The invention claimed is:

1. A method for adjusting eye color in a digital image, the method comprising:
    defining a plurality of color correction candidates, each candidate comprising a plurality of target color pixels and defining a first enclosing shape associated with the plurality of target color pixels;
    determining a composite shape based on the relative position of the first enclosing shape and a second enclosing shape;
    performing a plurality of tests on each color correction candidate using at least the plurality of target color pixels and the composite shape;
    for each color correction candidate, accumulating a number of failed match points (FMP's) based on a result of each test performed;
    comparing the accumulated FMP's of at least one color correction candidate to the accumulated FMP's of at least one other color correction candidate; and
    eliminating at least one of the first enclosing shape or the second enclosing shape from the composite shape based on the comparison, wherein the method is implemented on one or more computer systems.

2. The method of claim 1, each target color pixel having a color lying within at least one predetermined range in an HSV color space.

3. The method of claim 1, further comprising identifying at least one preferred color correction candidate based on the comparing, and adjusting the color of pixels in the at least one preferred color correction candidate.

4. The method of claim 3, the identifying at least one preferred color correction candidate comprising identifying the color correction candidate having the fewest number of FMP's.

5. The method of claim 1, further comprising identifying a best color correction candidate having the fewest number of FMP's based on the comparing, and not adjusting the color of pixels in any color correction candidate not within a threshold distance from the best color correction candidate.

6. The method of claim 1, further comprising identifying a best color correction candidate having the fewest number of FMP's based on the comparing, and not adjusting the color of pixels in any color correction candidate not within a threshold vertical distance from the vertical position in the image of the best color correction candidate.

7. The method of claim 1, further comprising, if the accumulated FMP's of one color correction candidate are equal to the accumulated FMP's of another color correction candidate, selecting the color correction candidate higher in the image for further processing.

8. The method of claim 7, the further processing comprising adjusting the color of pixels in the selected color correction candidate.

9. The method of claim 8, further comprising classifying each pixel in each color correction candidate into a pixel type, the pixel type being target color, glint, skin, or other-color.

10. The method of claim 8, the plurality of tests defined with respect to a plurality of regions within each color correction candidate.

11. The method of claim 10, the plurality of regions within each color correction candidate comprising an eye region (ER), a sclera region (SR), an iris region (IR), and a pupil region (PR).

12. The method of claim 11, the eye region comprising the entire region associated with a color correction candidate, the pupil region comprising an innermost region within the eye region, the iris region comprising a region surrounding the pupil region, and the sclera region comprising a region surrounding the iris region.

13. The method of claim 1, the accumulating a number of FMP's based on a result of each test performed comprising accumulating a number of FMP's if the result of a test is true.

14. An apparatus for adjusting eye color in a digital image, the apparatus comprising:
    means for defining a plurality of color correction candidates, each candidate comprising a plurality of target color pixels;
    means for defining a first enclosing shape associated with the plurality of target color pixels;
    means for determining a composite shape based on the relative position of the first enclosing shape and a second enclosing shape;
    means for performing a plurality of tests on each color correction candidate based on at least the plurality of target color pixels and the composite shape;
    means for, for each color correction candidate, accumulating a number of failed match points (FMP's) based on a result of each test performed;
    means for comparing the accumulated FMP's of at least one color correction candidate to the accumulated FMP's of at least one other color correction candidate; and
    means for eliminating at least one of the first enclosing shape or the second enclosing shape from the composite shape based on the comparison.

15. A computer program product for correcting eye color in a digital image, the product comprising:
    a non-transitory computer-readable medium comprising:
        code for causing a computer to define a plurality of color correction candidates, each candidate comprising a plurality of target color pixels, and to define a first enclosing shape associated with the plurality of target color pixels;
        determining a composite shape based on the relative position of the first enclosing shape and a second enclosing shape;
        code for causing a computer to perform a plurality of tests on each color correction candidate based on at least the plurality of target color pixels and the composite shape;
        code for causing a computer to, for each color correction candidate, accumulate a number of failed match points (FMP's) based on a result of each test performed;
        code for causing a computer to compare the accumulated FMP's of at least one color correction candidate to the accumulated FMP's of at least one other color correction candidate; and
        code for causing a computer to eliminate at least one of the first enclosing shape or the second enclosing shape from the composite shape based on the comparison.

16. The apparatus of claim 14, wherein each target color pixel has a color lying within at least one predetermined range in an HSV color space.

17. The apparatus of claim 14, further comprising means for identifying at least one preferred color correction candidate based on the comparing, and means for adjusting the color of pixels in the at least one preferred color correction candidate.

18. The apparatus of claim 17, the means identifying at least one preferred color correction candidate comprising means for identifying the color correction candidate having the fewest number of FMP's.

19. The apparatus of claim 14, further comprising means for identifying a best color correction candidate having the fewest number of FMP's based on the comparing, and not adjusting the color of pixels in any color correction candidate not within a threshold distance from the best color correction candidate.

20. The apparatus of claim 14, further comprising means for identifying a best color correction candidate having the fewest number of FMP's based on the comparing, and not adjusting the color of pixels in any color correction candidate not within a threshold vertical distance from the vertical position in the image of the best color correction candidate.

21. The apparatus of claim 14, wherein if the accumulated FMP's of one color correction candidate are equal to the accumulated FMP's of another color correction candidate, selecting the color correction candidate higher in the image for further processing.

22. The apparatus of claim 21, wherein the further processing comprises adjusting the color of pixels in the selected color correction candidate.

23. The apparatus of claim 22, further comprising means for classifying each pixel in each color correction candidate into a pixel type, the pixel type being target color, glint, skin, or other-color.

24. The apparatus of claim 22, wherein the plurality of tests are defined with respect to a plurality of regions within each color correction candidate.

25. The apparatus of claim 24, wherein the plurality of regions within each color correction candidate comprise an eye region (ER), a sclera region (SR), an iris region (IR), and a pupil region (PR).

26. The apparatus of claim 25, wherein the eye region comprises the entire region associated with a color correction candidate, the pupil region comprising an innermost region within the eye region, the iris region comprising a region surrounding the pupil region, and the sclera region comprising a region surrounding the iris region.

27. The apparatus of claim 14, wherein accumulating a number of FMP's based on a result of each test performed comprises accumulating a number of FMP's if the result of a test is true.

28. The computer program product of claim 15, wherein each target color pixel has a color lying within at least one predetermined range in an HSV color space.

29. The computer program product of claim 15, further comprising code for identifying at least one preferred color correction candidate based on the comparing, and code for adjusting the color of pixels in the at least one preferred color correction candidate.

30. The computer program product of claim 29, wherein identifying at least one preferred color correction candidate comprises identifying the color correction candidate having the fewest number of FMP's.

31. The computer program product of claim 15, further comprising code for identifying a best color correction candidate having the fewest number of FMP's based on the comparing, and not adjusting the color of pixels in any color correction candidate not within a threshold distance from the best color correction candidate.

32. The computer program product of claim 15, further comprising code for identifying a best color correction candidate having the fewest number of FMP's based on the comparing, and not adjusting the color of pixels in any color correction candidate not within a threshold vertical distance from the vertical position in the image of the best color correction candidate.

33. The computer program product of claim 15, wherein if the accumulated FMP's of one color correction candidate are equal to the accumulated FMP's of another color correction candidate, selecting the color correction candidate higher in the image for further processing.

34. The computer program product of claim 33, the further processing comprising adjusting the color of pixels in the selected color correction candidate.

35. The computer program product of claim 34, further comprising code for classifying each pixel in each color correction candidate into a pixel type, the pixel type being target color, glint, skin, or other-color.

36. The computer program product of claim 34, wherein the plurality of tests are defined with respect to a plurality of regions within each color correction candidate.

37. The computer program product of claim 36, wherein the plurality of regions within each color correction candidate comprising an eye region (ER), a sclera region (SR), an iris region (IR), and a pupil region (PR).

38. The computer program product of claim 37, wherein the eye region comprises the entire region associated with a color correction candidate, the pupil region comprises an innermost region within the eye region, and the iris region comprises a region surrounding the pupil region, and the sclera region comprises a region surrounding the iris region.

39. The computer program product of claim 1, wherein accumulating a number of FMP's based on a result of each test performed comprises accumulating a number of FMP's if the result of a test is true.

40. An apparatus for adjusting eye color in a digital image, the apparatus comprising:
a computer processor configured to:
define a plurality of color correction candidates, each candidate comprising a plurality of target color pixels;
define a first enclosing shape associated with the plurality of target color pixel;
determine a composite shape based on the relative position of the first enclosing shape and a second enclosing shape;
perform a plurality of tests on each color correction candidate based on at least the plurality of target color pixels and the composite shape, wherein for each color correction candidate, the processor is configured to accumulate a number of failed match points (FMP's) based on a result of each test performed;
compare the accumulated FMP's of at least one color correction candidate to the accumulated FMP's of at least one other color correction candidate; and
eliminate at least one of the first enclosing shape or the second enclosing shape from the composite shape based on the comparison.

41. The apparatus of claim 40, wherein each target color pixel has a color lying within at least one predetermined range in an HSV color space.

42. The apparatus of claim 40, wherein the computer processor is configured to identify at least one preferred color correction candidate based on the comparing, and adjust the color of pixels in the at least one preferred color correction candidate.

43. The apparatus of claim 42, wherein the computer processor is configured to identify at least one preferred color correction candidate by identifying the color correction candidate having the fewest number of FMP's.

44. The apparatus of claim 40, wherein the computer processor is configured to identify a best color correction candidate having the fewest number of FMP's based on the comparing, and not adjust the color of pixels in any color correction candidate not within a threshold distance from the best color correction candidate.

45. The apparatus of claim 40, wherein the computer processor is configured to identify a best color correction candidate having the fewest number of FMP's based on the comparing, and to not adjust the color of pixels in any color correction candidate not within a threshold vertical distance from the vertical position in the image of the best color correction candidate.

46. The apparatus of claim 40, wherein if the accumulated FMP's of one color correction candidate are equal to the accumulated FMP's of another color correction candidate, selecting the color correction candidate higher in the image for further processing.

47. The apparatus of claim 46, wherein the computer processor is configured to adjust the color of pixels in the selected color correction candidate.

48. The apparatus of claim 47, wherein the computer processor is configured to classify each pixel in each color correction candidate into a pixel type, the pixel type being target color, glint, skin, or other-color.

49. The apparatus of claim 47, wherein the plurality of tests are defined with respect to a plurality of regions within each color correction candidate.

50. The apparatus of claim 49, wherein the plurality of regions within each color correction candidate comprise an eye region (ER), a sclera region (SR), an iris region (IR), and a pupil region (PR).

51. The apparatus of claim 50, wherein the eye region comprises the entire region associated with a color correction candidate, the pupil region comprises an innermost region within the eye region, the iris region comprises a region surrounding the pupil region, and the sclera region comprises a region surrounding the iris region.

52. The apparatus of claim 40, the accumulating a number of FMP's based on a result of each test performed comprising accumulating a number of FMP's if the result of a test is true.

* * * * *